July 19, 1949.
D. B. DRISKILL
2,476,589
SOUND PROOF EAR APPLIANCE
Filed Nov. 13, 1946
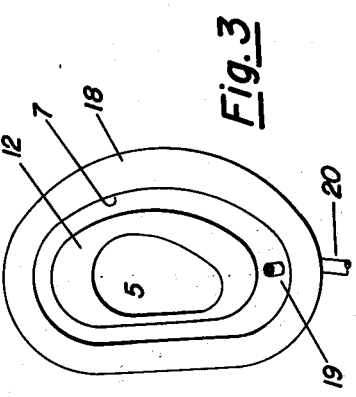
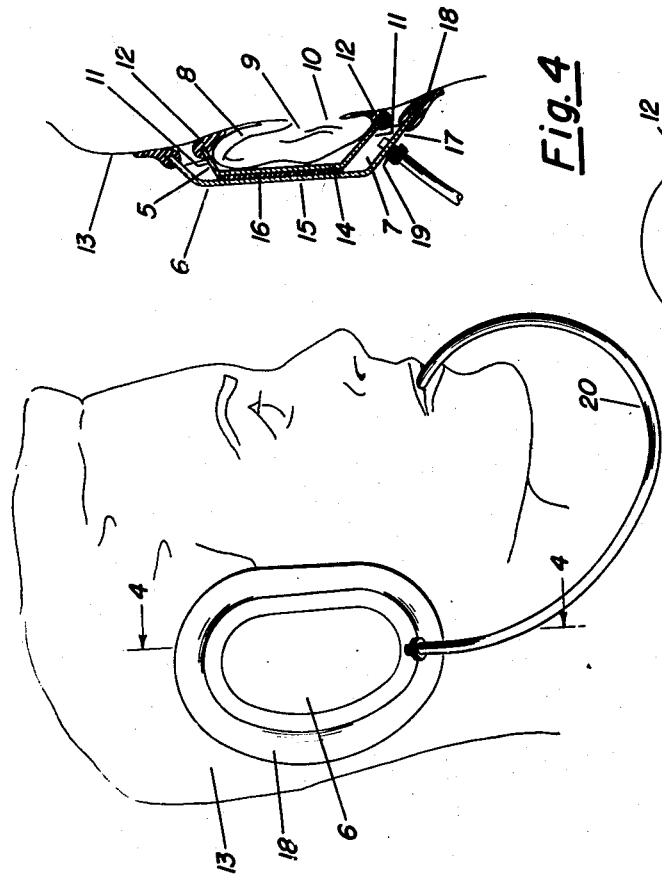
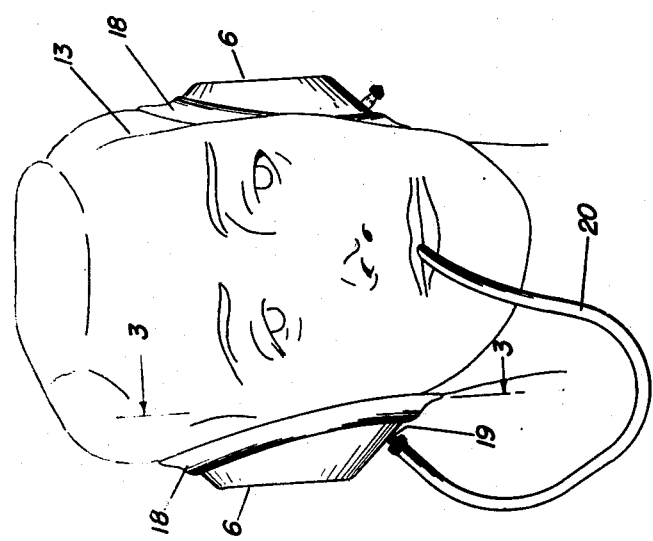
INVENTOR.
DALLAS B. DRISKILL
BY
ATTORNEY Patented July 19, 1949

2,476,589

UNITED STATES PATENT OFFICE 2,476,589

SOUNDPROOF EAR APPLIANCE

Dallas B. Driskill, Van Nuys, Calif.

Application November 13, 1946, Serial No. 709,605

7 Claims. (Cl. 128—152)

My invention relates to sound proof ear appliances, and its objects are more effectively to shut out from impact upon the tympanum or human ear drum, as occasion may require, sound vibrations or waves coming from any source whatever; to permit authors, inventors, artists, scientists, professional or business men, and others, to concentrate and devote their entire attention to the work at hand undiverted or undisturbed by outside sounds; to better alleviate and prevent the nerve tension and wear upon the human system by disturbing noises or sounds arising in manufacturing occupations, on railroads, in street cries and traffic, in offices, and by other auricular disturbances wherever encountered; to furnish a more effective means of bringing about refreshing sleep undisturbed by outside or awakening sounds and to contribute to the prevention of insomnia; to continue to equalize the pressure upon the ear drum between the inner and outer ear cavities while more effectively preventing the effects of injurious concussions upon, or the possible fracture of, said ear drum transmitted through sound waves or detonations occasioning violent changes in the atmosphere; to provide an ear protecting device employing a vacuum shield, which device is adjustable completely to cover the ear auricle and external auditory canal and which may readily be hermetically affixed thereover to the adjacent surface of the cranium and easily removed therefrom; to render the parts of said appliance readily accessible for inspection, adjustment, replacement or repair, and generally to provide an ear protecting device which is simple and economical of construction, efficient in action, and of prolonged life and durability.

These and other objects will appear from the drawing and as hereinafter described and set forth.

While I am aware that there are many forms of ear protecting devices in the prior art the purpose of which is to deaden or dampen noises which are disturbing to human beings or which are likely to injure human ear drums or to tend to produce deafness, I believe myself to be the first inventor in the art to devise an ear protector employing a vacuum as a shield to shut out sound waves from impacting the human ear drum, and to utilize the well known scientific fact that the longitudinal waves propagating sound require for their transmission a physical medium in the state of a solid, liquid or gas, and cannot pass through a vacuum.

Attention is hereby directed to the accompanying drawing, illustrating a perferred form of my invention, in which similar numerals of designation refer to similar parts throughout the several views, and in which—

Figure 1 is a front view of a human head showing the application of a pair of my improved ear protectors to the ears thereof, and the means employed by me for creating the required vacuum in each of said protectors through suction brought about by the wearer thereof;

Fig. 2 is a side view of the head and one of the appliances shown in Fig. 1;

Fig. 3 is a view of the interior of the appliance shown in Fig. 1, looking at the same in the direction of the arrows 3—3, and Fig. 4 is a section on line 4—4 of Fig. 2, looking in the direction of the arrows.

Referring to the drawing, I have there shown my invention incorporated in a pair of double-walled devices, each of which includes a shallow cup 5, inserted within and attached to a larger shallow dished cover plate 6; the flaring walls of both cup and plate having left between them the annular chamber 7. As shown, the cup 5 is formed to surround and to enclose the auricle 8 and the entrance of the external auditory canal 9 of the human ear 10; the circumferential rim 11 of said cup having affixed thereto the continuous yielding rubber strip or buffer 12, contoured to embrace and to nest the said auricle 8, and to bring about accurate and close engagement of said strip with the adjacent surface of the cranium 13 so as hermetically to seal the said cup, and prevent ingress or egress of air in or from said auditory canal. Also as shown, the cover plate 6 is made somewhat larger than the cup 5 in order that ample space may be provided between the walls thereof to allow for the formation of the annular chamber 7, and the wall of said plate is contoured closely to follow the form of the wall of said cup. Interposed between and cemented to the adjacent flat bottoms 14 and 15 of said cup and plate, respectively, is the sheet 16, preferably of rubber-like material; which sheet serves permanently to secure said cup and plate together, while at the same time permitting resilient movement without impairing the connection thereof. To the circumferential rim 17 of said plate 6 is affixed the yielding rubber roll or buffer 18, shaped to make accurate and close engagement with the adjacent surface of the cranium 13 outside of the rubber buffing strip 12, and serving to hermetically seal the chamber 7 against the ingress or egress of air therefrom, and against any communication whatever with the hollow of the cup 5 when encasing the auricle 8 as aforesaid.

In order to exhaust the air within the chamber 7, when one of my double-walled devices is applied to the ear as illustrated in the drawing, I supply the dished cover plate 6 with the conventional valve 19 passing therethrough, to which is removably attached the tube 20; the free end of which inserted within the mouth serves when sucked by the wearer to draw out the air to a sufficient extent to create a vacuum within the chamber 7 and thereby to shut out sound waves coming from without and to leave the wearer free from auricular disturbances. Such vacuum may be made partial or complete as desired by the wearer, to relieve the disturbance, depending upon the amount of suction applied, and after the necessary adjustments are made for each ear, the tube 20 may be removed for use when occasion requires. By reason of the vacuum created as aforesaid, each of my hearing devices will be securely clamped to the cranium, without the necessity of head-pieces or additional securing means, and may easily be removed either by pressing the release of the valve 19, or by lifting the edge of the roll 18. When the device is attached as hereinbefore described, the nesting of the auricle 8 and closure of the hollow within the cup 5 with its buffed rim 11 against the cranium will completely enclose said auricle and exclude any communication with the chamber 7, so that no suction can be created in the hollow of said cup and the equalized normal pressure upon the ear drum will continue undisturbed.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the above description, and all changes which come within the meaning and range of equivalency of the claims are therefore intended to be embraced therein.

What I claim and desire to secure by Letters Patent is:

1. A sound proof ear appliance, comprising a closure for the auricle and external auditory canal of the human ear, and a valve opening outwardly from said closure and adapted to connect with vacuum means for exhausting air from said closure.

2. A sound proof ear appliance, comprising inner and outer closures for the auricle and external auditory canal of the human ear, and a valve opening outwardly from said outer closure and adapted to connect with vacuum means for exhausting air therefrom.

3. A sound proof ear appliance, comprising inner and outer closures for the auricle and external auditory canal of the human ear, the said closures being each hermetically sealed when applied to the human cranium over said ear, and a valve opening outwardly from said outer closure and adapted to connect with means for exhausting air therefrom and creating a vacuum therein.

4. A sound proof ear appliance, comprising a cup formed to cover the auricle and external auditory canal of the human ear, a dished plate covering said cup with a chamber formed therebetween and when applied to the human cranium over said ear being hermetically sealed from said cup and from the outside air, and a valve opening outwardly from said chamber and adapted to connect with means for exhausting air therefrom and creating a vacuum therein.

5. A sound proof ear appliance, comprising a cup with a yieldable rim formed to cover and hermetically seal the auricle and external auditory canal of the human ear, a dished plate with a yieldable rim secured to and covering said cup with an annular chamber formed therebetween and when applied to the human cranium over said ear being hermetically sealed from said cup and the outside air, and a valve opening outwardly from said chamber and adapted to connect with means for exhausting air therefrom and creating a vacuum therein.

6. A sound proof ear appliance as set forth in claim 5, including means for securing together the bottoms of the cup and plate so as to permit the resilient movement thereof in respect to each other without impairing the connection thereof.

7. A sound proof ear appliance, comprising a cup with a flaring yieldable rim formed to cover and hermetically seal the auricle and external auditory canal of the human ear, a dished plate with a flaring yieldable rim nesting said cup with an annular chamber formed between the flaring walls of said cup and plate, and when applied to the human cranium over said cup being hermetically sealed from said cup and the outside air, and an air valve connected with a passageway through the wall of said plate communicating with said chamber and a tube attached to said valve and adapted for connection with means for exhausting the air from said chamber and for creating a vacuum therein.

DALLAS B. DRISKILL.

REFERENCES CITED

The following references are of record in the file of this patent:

UNITED STATES PATENTS

| Number | Name | Date |
|---|---|---|
| 1,988,880 | Strouse | Jan. 22, 1935 |

FOREIGN PATENTS

| Number | Country | Date |
|---|---|---|
| 467,298 | Germany | Oct. 22, 1928 |